United States Patent
Chen et al.

(10) Patent No.: US 7,885,953 B2
(45) Date of Patent: Feb. 8, 2011

(54) OFF-LOADING STAR JOIN OPERATIONS TO A STORAGE SERVER

(75) Inventors: Ying-lin Chen, San Jose, CA (US); You-Chin Fuh, San Jose, CA (US); Wei Han, San Francisco, CA (US); Fen-Ling Lin, San Jose, CA (US); Inderpal Singh Narang, Saratoga, CA (US); Lin Qiao, San Jose, CA (US); Vijayshankar Raman, Sunnyvale, CA (US); Kouhorng Allen Yang, Saratoga, CA (US)

(73) Assignee: International Business Machines Corporation, Armonk, NY (US)

( * ) Notice: Subject to any disclaimer, the term of this patent is extended or adjusted under 35 U.S.C. 154(b) by 441 days.

(21) Appl. No.: 11/866,907

(22) Filed: Oct. 3, 2007

(65) Prior Publication Data

US 2009/0094258 A1    Apr. 9, 2009

(51) Int. Cl.
G06F 17/30    (2006.01)
G06F 7/00    (2006.01)

(52) U.S. Cl. .................. 707/713; 707/602

(58) Field of Classification Search .............. None
See application file for complete search history.

(56) References Cited

U.S. PATENT DOCUMENTS

| | | | |
|---|---|---|---|
| 5,495,601 A | | 2/1996 | Narang et al. |
| 5,960,428 A | * | 9/1999 | Lindsay et al. .................. 707/4 |
| 6,061,676 A | * | 5/2000 | Srivastava et al. .............. 707/3 |
| 6,944,662 B2 | | 9/2005 | Devine et al. |
| 7,167,852 B1 | * | 1/2007 | Ahmed et al. .................. 707/1 |
| 2001/0013030 A1 | * | 8/2001 | Colby et al. .................. 707/1 |
| 2004/0117600 A1 | * | 6/2004 | Bodas et al. ................ 712/210 |
| 2006/0167865 A1 | * | 7/2006 | Andrei .......................... 707/4 |
| 2007/0061288 A1 | * | 3/2007 | Fuh et al. ........................ 707/2 |
| 2008/0027904 A1 | * | 1/2008 | Hill et al. ........................ 707/2 |
| 2008/0222123 A1 | * | 9/2008 | Colby et al. .................... 707/4 |

OTHER PUBLICATIONS

Dr. Jens-Peter, Data Warehousing SoSe 2006, May 4, 2006.*

(Continued)

*Primary Examiner*—Neveen Abel Jalil
*Assistant Examiner*—Tarek Chbouki
(74) *Attorney, Agent, or Firm*—Jon A. Gibbons; Fleit Gibbons Gutman Bongini & Bianco PL

(57) ABSTRACT

A method, storage server, and computer readable medium for off-loading star-join operations from a host information processing system to a storage server. At least a first and second set of keys from a first and second dimension table, respectively are received from a host system. Each of the first and second set of keys is associated with at least one fact table. A set of locations associated with a set of foreign key indexes are received from the host system. A set of fact table indexes are traversed. At least a first set of Row Identifiers ("RIDs") associated with the first set of keys and at least a second set of RIDs associated with the second set of keys are identified. An operation is performed on the first and second sets of RIDs to identify an intersecting set of RIDs. The intersecting set of RIDs are then stored.

20 Claims, 5 Drawing Sheets

OTHER PUBLICATIONS

U.S. Appl. No. 12/060,501, filed Apr. 1, 2008.
Kumar et al., Exploiting Programmable Network Interfaces for Parallel Query Execution in Workstation Clusters, ISBN 1424400546, 2006 IEEE.
Ammons et al., Libra: A Library Operating System for a JVM in a Virtualized Execution Environment, VEE '07, 2007 ACM 978-1-59593-630- 1/07/0006, Jun. 13-15, 2007, pp. 44-54, San Diego, California.
Carey et al., Data Delivery in a Service-Oriented World: The BEA AquaLogic Data Services Platform, SIGMOD 2006, Copyright 2006 ACM 1-59593-256-9/06/0006, Jun. 27-29, 2006, pp. 695-705, Chicago, Illinois USA.
Bala et al., Dynamo: A Transparent Dynamic Optimization System, Copyright 2000, PLDI 2000, pp. 1-12, ACM 1-58113-199-2/00/0006, British Columbia, Canada.
Borkar et al., Query Processing in the AquaLogic Data Services Platform, VLDB '06 , Sep. 12-15, 2006, pp. 1037-1048, Copyright 2006 VLDB Endowment, ACM 1-59593-385-9/06/09, Seoul, Korea.
Riedel et al., Active Disks for Large-Scale Data Processing, IEEE Computer, 2001, pp. 68-74, 0018-9162/01, USA.
Weininger, Efficient Execution of Joins in a Star Schema, Copyright 2002 ACM 1-58113-497, May 2, 2006, 4 pgs., ACM SIGMOD '2002 Jun. 4-6, Madison, WI, USA.
Raman et al., Lazy, Adaptive RID-List Intersection, and its application to Index Anding, SIGMOD'07 Jun. 11-14, 2007, 12 pgs., ACM978-1-59593-686-8/07/0006, Beijing, China.

* cited by examiner

OFF-LOADING STAR JOIN OPERATIONS TO A STORAGE SERVER

FIELD OF THE INVENTION

The present invention generally relates to the database management systems, and more particularly relates to off-loading Database Management System operations to a storage controller.

BACKGROUND OF THE INVENTION

Processing requirements of businesses are pushing many computing technologies to the limits. Businesses comprising I/O and CPU intensive environments are requesting for more efficient and less expensive computing solutions. For example, businesses desire, among other things, improved economics for running operating systems, simplified management tasks for reduce costly manpower, infrastructure simplification and a better all around value for their customers.

One method of providing a more efficient and economical processing environment is to share a workload among various processor. One type of workload that is very I/O and CPU intensive is a business intelligence query. However, current solutions tend to share workload processing among processors in the same mainframe/server. Therefore, the processing environment in the mainframe/server remains over-utilized while other system components such as storage controllers/servers are under-utilized.

Therefore a need exists to overcome the problems with the prior art as discussed above.

SUMMARY OF THE INVENTION

Briefly, in accordance with the present invention, disclosed are a method, storage server, and computer readable medium for off-loading star-join operations from a host information processing system to a storage server. The method includes receiving at least a first set of keys from a first dimension table and at least a second set of keys from a second dimension table from a host information processing system. Each of the first and second set of keys is associated with at least one fact table. A set of locations associated with a set of foreign key indexes are received from the host information processing system. A set of fact table indexes are traversed in response to the receiving. At least a first set of Row Identifiers ("RIDs") associated with the first set of keys and at least a second set of RIDs associated with the second set of keys are identified in response to the traversing. An operation is performed on the first set of RIDs and the second set of RIDs to identify an intersecting set of RIDs. The intersecting set of RIDs are then stored.

In another embodiment, a storage server for off-loading star-join operations from a host information processing system is disclosed. The storage server includes a processor and a memory that is communicatively coupled to the processor. The storage server also includes an off-load manager that is communicatively coupled to the processor and the memory. The off-load manager is adapted to receive at least a first set of keys from a first dimension table and at least a second set of keys from a second dimension table from a host information processing system. Each of the first and second set of keys is associated with at least one fact table. A set of locations associated with a set of foreign key indexes are received from the host information processing system. A set of fact table indexes are traversed in response to the receiving. At least a first set of Row Identifiers ("RIDs") associated with the first set of keys and at least a second set of RIDs associated with the second set of keys are identified in response to the traversing. An operation is performed on the first set of RIDs and the second set of RIDs to identify an intersecting set of RIDs. The intersecting set of RIDs are then stored.

In yet another embodiment, a computer program storage product for off-loading star-join operations from a host information processing system to a storage server is disclosed. The computer program storage product includes instructions for receiving at least a first set of keys from a first dimension table and at least a second set of keys from a second dimension table from a host information processing system. Each of the first and second set of keys is associated with at least one fact table. A set of locations associated with a set of foreign key indexes are received from the host information processing system. A set of fact table indexes are traversed in response to the receiving. At least a first set of Row Identifiers ("RIDs") associated with the first set of keys and at least a second set of RIDs associated with the second set of keys are identified in response to the traversing. An operation is performed on the first set of RIDs and the second set of RIDs to identify an intersecting set of RIDs. The intersecting set of RIDs are then stored.

One advantage of the present invention is that various DBMS operations can be off-loaded from a host information processing system to a storage server. This allows for more resources to be freed and better utilized at the host system. In other words, the efficiency of the host system can be increased. Off-loading DBMS operations provides (but is not limited to) a large data reduction; reduction of CPU consumption on the host system; less data traffic through the I/O channel to the host system; allows for better utilization of the host system 102 buffer pool; enables more workload on the host system.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

DETAILED DESCRIPTION

As required, detailed embodiments of the present invention are disclosed herein; however, it is to be understood that the disclosed embodiments are merely examples of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and similar terms as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

System Architecture Example

Figure 1:
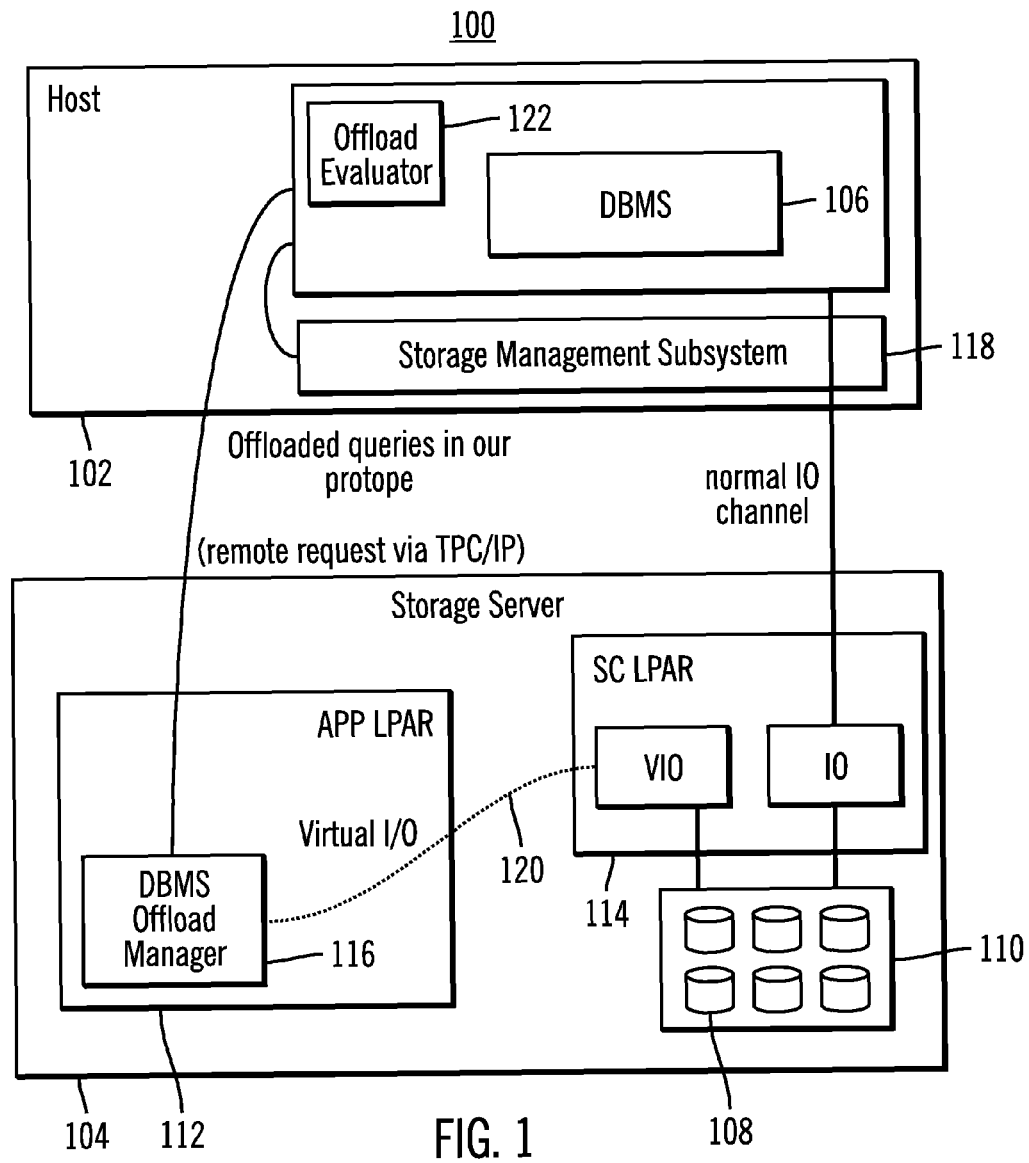
FIG. 1 is a block diagram illustrating a system for off-loading DBMS operations according to one embodiment of the present invention.

According to one embodiment of the present invention, as shown in FIG. 1, a system 100 for off-loading Database Management System ("DBMS") operations to one or more storage servers/controllers 104 is shown. In particular, FIG. 1 shows a host information processing system 102 communicatively coupled to one or more storage servers 104. The host information processing system 102 comprises a DBMS 106 such as IBM's DB2 and accesses data 108 in a data warehouse 110 residing on the storage server 104. The DBMS 106 communicates with the storage server 104 via a Storage Management Subsystem ("SMS") 118. In one embodiment, the SMS 118 automatically manages data from creation to expiration. In one embodiment, a star-join schema comprising fact tables and dimension tables is used to organize the data within the data warehouse 110. A fact table, in one embodiment, includes (but is not limited to) metrics (facts), and measurements, of a specific process such as a business process being monitored. A fact table also includes foreign keys that refer to primary keys in a dimension table. A dimension table, in one embodiment, includes attributes/fields used to constrain and group data during a data warehouse query. It is assumed that the reader is familiar with the more detailed aspects of a star-join schema.

The storage server 104, in one embodiment, includes hard drive and communication enclosures, high-speed interconnects and a compute platform that includes one or more servers. It should be noted that FIG. 1 only shows a single server for simplicity since both each server can run identical Logically Partitioned Address Regions ("LPAR") and code configurations. The storage server 104, in one embodiment can support multiple LPARs via a hypervisor (not shown). A hypervisor is the controlling element of LPARs in terms of memory mapping, context switching from one LPAR to another on shared CPUs, and is generally involved in all communications from the software to the real hardware. In one embodiment, the hypervisor is configured to provide a mechanism for virtualizing the hardware of the storage server 104 and partitioning the CPU, memory and peripherals across multiple LPARS (equivalent to virtual machines on other systems), each with an independent OS image.

The hypervisor can also provide a high degree of fault and performance isolation between LPARs. In addition, the hypervisor allows restricted memory-to-memory transfers across LPAR boundaries. This allows applications to run in one LPAR and have high-bandwidth, low-latency access to data owned by a storage controller in another LPAR on the same hypervisor. More importantly, this is done without impacting the stability or performance of the storage controller function.

The storage server 104, in one embodiment, includes an application LPAR 112 and a storage controller LPAR 114. The application LPAR 112 can run an independent OS image and can comprise drivers that allow applications to access data 108 stored on the server 104 over virtual I/O channels 120. Virtual I/O 120 channels provide I/O capabilities without physical cables. The application LPAR 112 includes an off-load manager 116 for off-loading various DBMS operations from the host information processing system 102 to the storage server 104. The off-load manager 116, in one embodiment, communicates with the external world such as the DBMS 106 over a network interface owned by the application LPAR 112. The off-load manager 106 is discussed in greater detail below. The storage controller LPAR 114 processes I/O operations received over external interfaces. The storage controller LPAR 114 also processes virtual I/O requests received from the application LPAR 112.

It should be noted that the system 100 of FIG. 1 is only one example of a system applicable to embodiments of the present invention. Other system architectures may also be used wherein an off-load manager 116 is able to off-load DBMS operations to a storage server.

Off-Loading DBMS Operations from a Host System to a Storage Server

As discussed above, one advantage of embodiments of the present invention is that various DBMS operations can be off-loaded from a host information processing system 102 to a storage server 104. This allows for more resources to be freed and better utilized at the host system 102. In particular, the off-load manager 116 off-loads operations in portions of a Query Execution Plan ("QEP") from the host system 102 to the storage server 104. A QEP is collection of steps used to access data in the data 110 warehouse 112. As discussed above, a star-join schema that comprises fact tables and dimension tables can be used to organize the data within the data warehouse 110. In this embodiment, a type of QEP that is used to access data organized in a star-join schema is a star-join plan.

Figure 2:
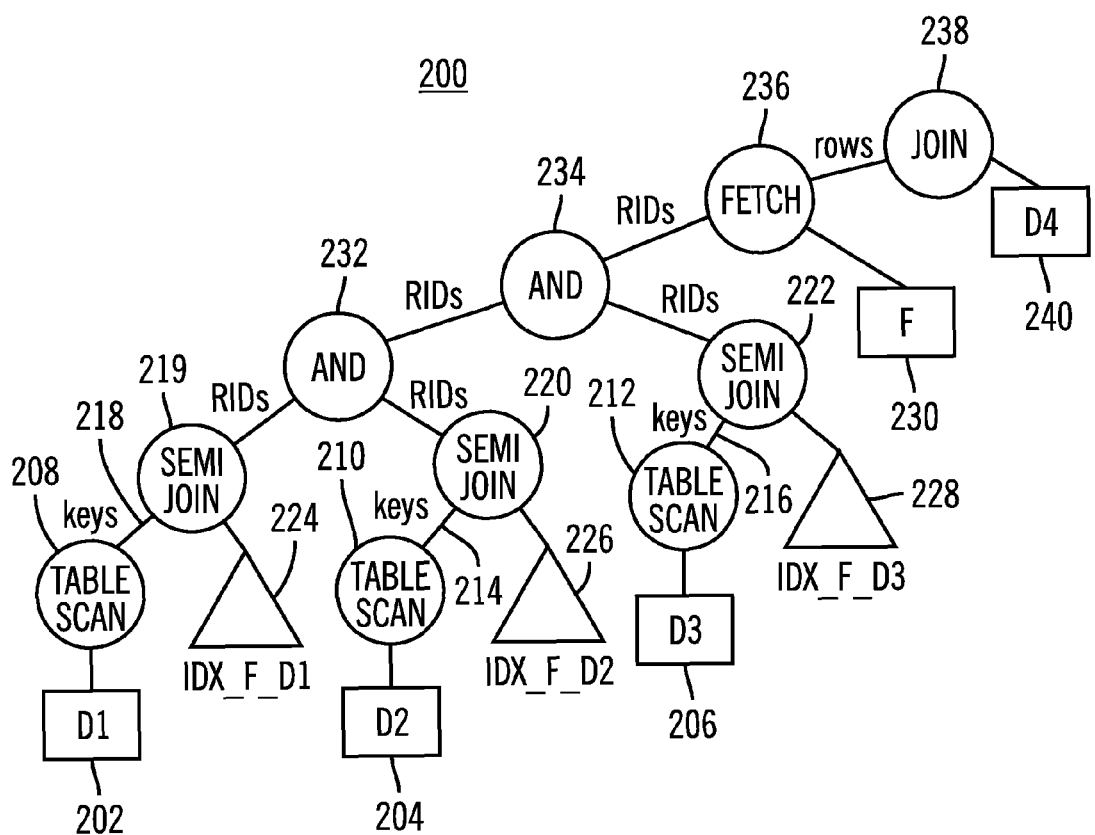
FIG. 2 is a tree diagram illustrating an example of a star-join execution plan according to one embodiment of the present invention.

FIG. 2 shows one example of a star-join plan 200. The rectangular boxes 202, 204, 206 each represent a dimension table D1, D2, D3 in the data warehouse 112. As discussed above dimensions are the products of a fact table. Each of the circles 208, 210, 212 coupled to the respective rectangular boxes 202, 204, 206 indicates an action that is to be performed upon those tables. For example, FIG. 2 shows that a Table Scan function is to be performed upon each of the tables D1, D2, D3. Coupled to each of the Table Scan circles 208, 210, 212 are edges 214, 216, 218 labeled "keys". This indicates that the output of each of the Table Scan functions is keys, which are unique identifiers of a row in each of the respective tables D1, D2, D3.

A semi-join circle 219, 220, 222 is coupled to the edge 214, 216, 218 and a triangle 224, 226, 228 representing an Index function on a respective fact table. The rectangle 230 comprising "F" represents a foreign key. The index function is performed on a foreign key column and connects the respective dimension table 202, 204, 206 with a respective fact table. The output of the Semi-Join operations are RIDs (Row Identifier) in the respective fact table. In the example of FIG. 2 there are three dimension tables D1 202, D2 204, and D3 206 so three RID lists are generated.

One goal of the star-join plan 200 of FIG. 2 is to identify the common RIDs within the three RID lists. Therefore, two of the RID lists are ANDed together via a first AND operation 232 and the resulting RID list is ANDed with the remaining RID list via a second AND operation 234. A FETCH operation 236 takes the final RID list that results from the second AND operation 234 and fetches the corresponding fact table rows using the foreign key "F" 230. A JOIN operation 238 joins the remaining dimension tables such as dimension table D4 240 that did not participate in the SEMIJOIN 220, 222 and the AND 232, 234 operations.

A QEP can comprise many different operations. One advantage of the present invention is that one or more of these operations can be off-loaded to the storage server 104 thereby increasing the efficiency of the host system 102. Stated differently, processing data locally at the storage server 104 provides (but is not limited to) a large data reduction; reduction of CPU consumption on the host system 104; less data traffic through the I/O channel to the host system 102; allows for better utilization of the host system 102 buffer pool; and enables more workload on the host system 102.

It should be noted that a wide spectrum of workloads and not just business intelligence queries such as a star-join queries are good candidates for off-loading. A star-join query has been selected as one example of a candidate query because such queries tend to have higher data reduction ratios, and they are CPU intensive. Moreover, star-join queries tend to have lower consistency requirements. It should also be noted that even though the system 100 of FIG. 1 can be configured to run entire applications, off-loading an entire query to the storage server 102 is not always beneficial. This is because not all the operations provide a benefit when off-loaded. Therefore, an off-load evaluator 122 dynamically determines which operations of a query are to be off-loaded to the storage server 104. Alternatively, an administrator can also configure the system 100 to off-load a given set of operations.

Off-Loading of Star-Join Queries

Star-join queries are crucial to business intelligence and decision making. As an example, the following query analyzes coffee sales at cities in California by joining a fact table Orders with multiple dimensions.

```
SELECT    S.city,SUM(O.quantity),COUNT(E.name)
FROM      orders O, customer C, store S, product P, employee E
WHERE     O.custId=C.id AND O.storeId=S.id AND
          O.prodId=P.id AND O.empId=e.id AND
          C.age = 65 AND S.state='CA' AND
          P.category='COFFEE' AND
E.type='FULLTIME'
          AND O.year between 2000 and 2005
GROUP BY S.city
```

Figure 3:
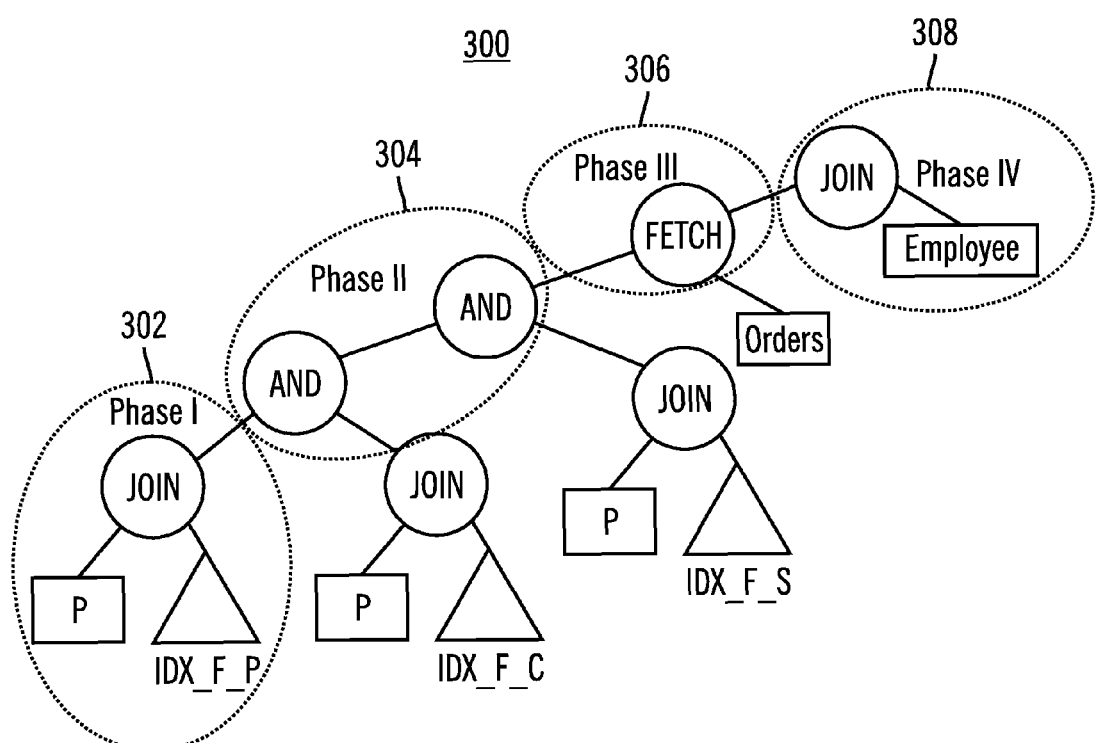
FIG. 3 is a tree diagram illustrating another example of a star-join execution plan according to one embodiment of the present invention.

When Orders is large, it is prohibitively expensive to answer such a query via a table scan on Orders. Instead, most DBMSs would use indexes to compute lists of matching RIDs for each predicate: O1={Orders.rid|C.age=65}, O2={Orders.rid|S.state='CA'}, etc. For each predicate, the RIDs formed from index lookups are usually in several sorted lists. So they need to be merged to form one list sorted by RID. They then compute I=O1 \O2\ . . . , then fetch rows in Orders corresponding to RIDs in I, and finally compute the aggregate on these rows. FIG. 3 shows a detailed execution plan 300 for this query.

It has four phases: RID-list (Row Identifier list) formation phase 302, an Intersection phase 304, a Fetch phase 306, and a Residuals phase 308. During the RID-list phase 302, RID-lists of Orders tuples are identified that satisfy each predicate. It should be noted that the term "leg" is also used to refer to the RID-list corresponding to a predicate. The matching rows in the dimension tables are identified. The dimension keys in the matches are used to look up an appropriate foreign key index on Orders. The results of this lookup are lists of matching RIDs for each value of dimension key. We call these lists as segments.

We now have a collection of segments that satisfy the predicate (one for each value of the foreign key). We merge the RIDs in all these segments together to form a single sorted leg for this predicate. E.g., for a predicate category="coffee", we look up into an index on O.prodId with each value in {P.id|category="coffee"}).

During the Intersection phase 304, the intersection of these legs via a tree of AND operators are determined. During the FETCH phase 306, the list of RIDs in the intersection, i.e., ones that match every predicate, is usually much smaller than the fact table size. So we directly fetch the fact table rows corresponding to these RIDS (RIDs are usually physical (page/slot identifiers). During the RESIDUALS phase 308 these fetched rows are joined with all the remaining dimension tables (residual tables), to get any remaining columns and evaluate any residual predicates. With most predicates, the optimizer has a choice of applying them via the intersection or as a residual. Applying via the intersection has the benefit of early filtering of rows, but the cost is that of forming the matching RID-list. Usually only very poorly selective predicates (where almost no row is filtered) are chosen as residuals.

Off-Load Index Anding

As discussed above, the RID-list formation and intersection phases, i.e. index ANDing, consume a majority of the CPU time of a query. Therefore, this portion of the plan 300 is offloaded in order to boost the business intelligence queries. A more stable performance can be achieved not only by early data reduction by a storage server 104, but also by improving the algorithms. It is assumed the indexes are read-only in the offload phase, which can be realized through shadow paging or locking.

The offload process, in one embodiment, is initiated from a DBMS component at the beginning of index ANDing. The payload is formatted in the following way. The first entry is the unique query ID. The second entry is the number of dimensions for index ANDing. For each dimension, there is a list of keys to join with fact table. Along with the dimension table keys, there is location information of the index on fact table foreign key, which contains the index volume ID, begin Control Interval ("C"I) and end CI, CKD addressing scheme including cylinder, head and record (CCHHR), and block size. With such information, the index pages can be accessed from a storage server directly.

The overall offload flow, in one embodiment, includes two phases, the probing phase and the ANDing phase. In this probing phase, the DBMS 106 first sends a probing request to the offload manager 116. The probing request includes the complete payload for the index ANDing. However, the offload manager 116 does not execute a complete version of index ANDing. It checks a small portion of the indexes and estimates the cardinality of each leg. the offload manager 116 further sorts the legs by their cardinalities. Finally, the sorted legs along with their cardinalities are sent back to the DBMS 106. The DBMS 106 may use that information to correct optimizer's estimation error in case that the offload process is not successful and the flow falls back to the DBMS 106. 2. With respect to the probing phase, the DBMS 106 sends the ANDing request to the offload manager 116. Here, the ANDing request includes the complete payload as the offload manager 116 does not keep track of state between phases. The offload manager 116 conducts index ANDing per request. The final RID-list is sent back to DBMS 106. Upon receiving the reply, the DBMS 106 constructs a new RID-list and continues executing the remaining of the plan.

Another phase, data coalescing, can also be added to the offload flow. This function is similar to the previous one except that offload manager 116 returns rows of the fact table as the result of dynamic index ANDing. The DBMS 106 continues to perform the rest of the star-join from the beginning of the inside-out join phase. This function has a dependency on whether CKD write is available in the storage server 104 or whether a fast RPC protocol is established between the storage server 104 and the host information processing system 102.

For security reasons, one DBMS 106 remote request is authorized to access only one volume. The above discussed phases, in one example, work for the case when all the required indexes are on one storage volume and hence can be accessed by one remote request from the DBMS 106. However, indexes can also scatter over storage volumes. There are three different cases where indexes can locate: 1) one single index can spread across volumes; 2) each index resides in one volume. There can be multiple storage servers used for a database. For instance, a storage server 102 can have two servers running identical LPAR and configurations. All the indexes reside on the same storage server, but are on different volumes. A third case is 3) indexes are on different storage servers. During both the probing and the ANDing phases, the DBMS 106 issues multiple requests, one per volume. Each request includes the information of all the indexes residing on a particular volume. The offload manager 116 tracks the state of index ANDing between requests via a scratchpad on a storage server application LPAR. The scratchpad records the intersection result between the RID lists from the first and second requests. Then, the RID-list stored in the scratchpad is used to intersect with the RIDlist from running the successive request, and the resulting RID-list is again stored in the scratchpad. Finally, the reply to the final DBMS 116 request includes the final RID-list.

Information Processing System

Figure 4:
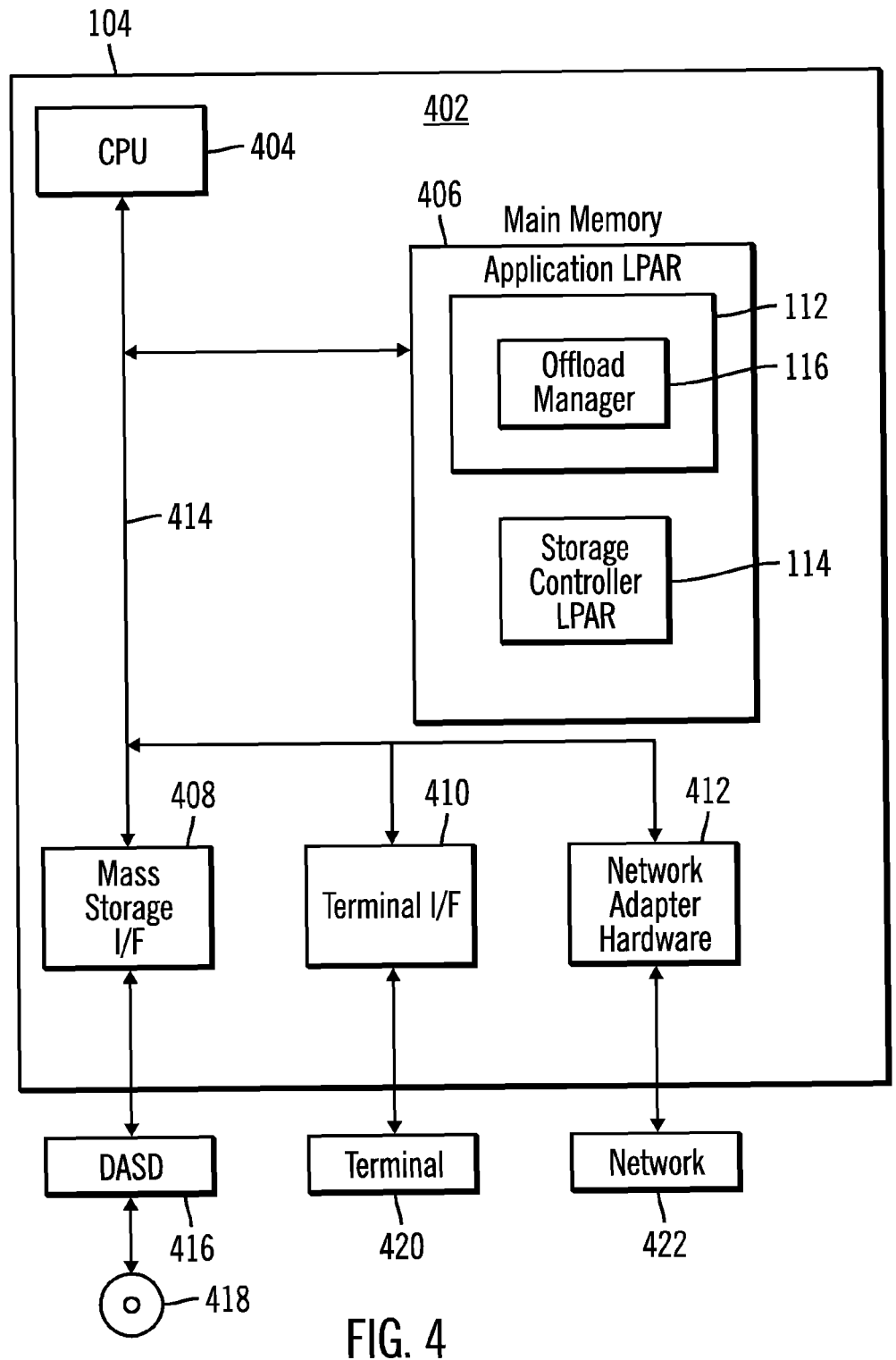
FIG. 4 is a detailed view of a processing node according to the present invention.

FIG. 4 is a block diagram illustrating a more detailed view of the processing node 104 of FIG. 4, which from hereon in is referred to as the storage server 104. The storage server 104 is based upon a suitably configured processing system adapted to implement various embodiments of the present invention. Any suitably configured processing system is similarly able to be used as the storage server 104 by embodiments of the present invention, for example, a personal computer, workstation, or the like. The storage server 104 includes a computer 402. The computer 402 includes a processor 400, main memory 406, a mass storage interface 408, a terminal interface 410, and network hardware 412. The mass storage interface 408 is used to connect mass storage devices such as data storage device 416 to the information processing system 104. One specific type of data storage device is a computer readable medium such as a CD drive or DVD drive, which may be used to store data to and read data from a CD 418 (or DVD). Another type of data storage device is a data storage device configured to support, for example, NTFS type file system operations.

The main memory 406, in one embodiment, includes the application LPAR 112, offload manager 116, and the storage LPAR 114. Although only one CPU 404 is illustrated for computer 402, computer systems with multiple CPUs can be used equally effectively. Embodiments of the present invention further incorporate interfaces that each includes separate, fully programmed microprocessors that are used to off-load processing from the CPU 404. The terminal interface 406 is used to directly connect the storage server 104 with one or more terminals 420 to the storage server 104 for providing a user interface to the computer 402. These terminals 420, which are able to be non-intelligent or fully programmable workstations, are used to allow system administrators and users to communicate with the information processing system 104. A terminal 420 is also able to consist of user interface and peripheral devices that are connected to storage server 104.

An operating system image (not shown) included in the main memory 406 is a suitable multitasking operating system such as the Linux, UNIX, Windows XP, and Windows Server operating system. Embodiments of the present invention are able to use any other suitable operating system. Some embodiments of the present invention utilize architectures, such as an object oriented framework mechanism, that allows instructions of the components of operating system (not shown) to be executed on any processor located within the storage server 104. The network adapter hardware 106 is used to provide an interface to the network 422. Embodiments of the present invention are able to be adapted to work with any data communications connections including present day analog and/or digital techniques or via a future networking mechanism.

Although some embodiments of the present invention are described in the context of a fully functional computer system, those skilled in the art will appreciate that embodiments are capable of being distributed as a program product via a CD/DVD, e.g. CD 418, or other form of recordable media, or via any type of electronic transmission mechanism.

Process For Off-Loading Index ANDing Operations

Figure 5:
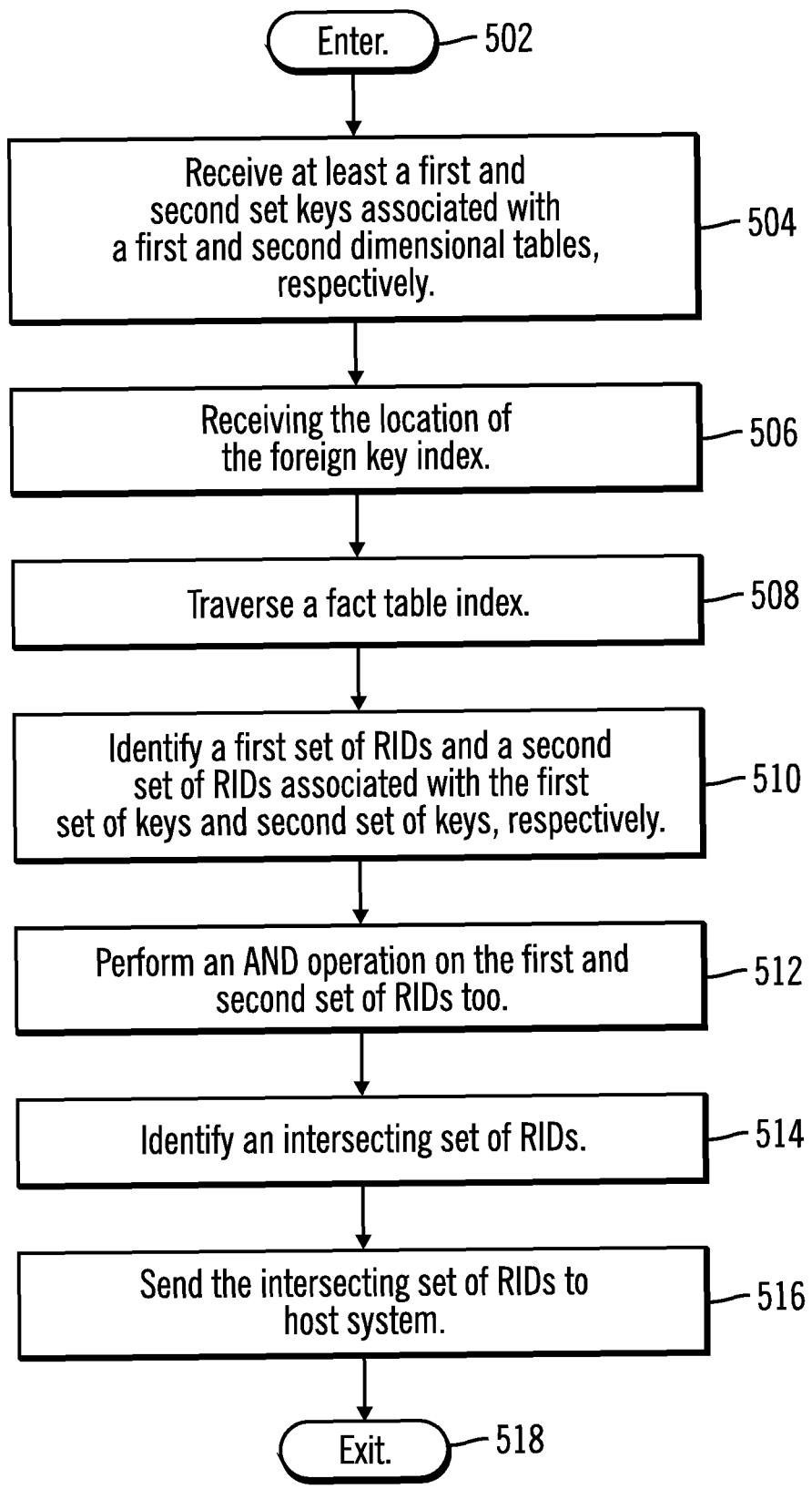
FIG. 5 is an operational flow diagram illustrating a process of off-loading a set of star-join operations from a host information processing system to a storage server according to one embodiment of the present invention.

FIG. 5 illustrates one example process for off-loading index ANDing operations form a host information processing system to a storage server. The operational flow diagram of FIG. 5 begins at step 502 and flows directly to step 504. The storage server 104, at step 504, receives a first set of keys and a second set of keys from the host information processing system. These keys are each associated with a different set of dimension tables. The storage server 104, at step 506, also receives the location of a foreign key index.

The off-load manager 116, at step 508, traverses a fact table index. A set of RIDs associated with the first set of keys and another set of RIDs associated with the second set of keys, at step 510, are then identified. The off-load manager 116, at step 512, performs an AND operation on the two sets of RIDs. An intersecting set of RIDs, at step 514, is then identified. The off-load manager 116, at step 516, sends the intersecting set of RIDs to the host information processing system 102. The control flow then exits at step 518.

Non-Limiting Examples

The present invention as would be known to one of ordinary skill in the art could be produced in hardware or software, or in a combination of hardware and software. However in one embodiment the invention is implemented in software. The system, or method, according to the inventive principles as disclosed in connection with various embodiments, may be produced in a single computer system having separate elements or means for performing the individual functions or steps described or claimed or one or more elements or means combining the performance of any of the functions or steps disclosed or claimed, or may be arranged in a distributed computer system, interconnected by any suitable means as would be known by one of ordinary skill in the art.

According to the inventive principles as disclosed in connection with various embodiments, the invention and the inventive principles are not limited to any particular kind of computer system but may be used with any general purpose computer, as would be known to one of ordinary skill in the art, arranged to perform the functions described and the method steps described. The operations of such a computer, as described above, may be according to a computer program contained on a medium for use in the operation or control of the computer, as would be known to one of ordinary skill in the art. The computer medium, which may be used to hold or contain the computer program product, may be a fixture of the computer such as an embedded memory or may be on a transportable medium such as a disk, as would be known to one of ordinary skill in the art.

The invention is not limited to any particular computer program or logic or language, or instruction but may be practiced with any such suitable program, logic or language, or instructions as would be known to one of ordinary skill in the art. Without limiting the principles of the disclosed invention any such computing system can include, inter alia, at least a computer readable medium allowing a computer to read data, instructions, messages or message packets, and other computer readable information from the computer readable medium. The computer readable medium may include non-volatile memory, such as ROM, Flash memory, floppy disk, Disk drive memory, CD-ROM, and other permanent storage. Additionally, a computer readable medium may include, for example, volatile storage such as RAM, buffers, cache memory, and network circuits.

Furthermore, the computer readable medium may include computer readable information in a transitory state medium such as a network link and/or a network interface, including a wired network or a wireless network that allows a computer to read such computer readable information.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method for off-loading star join operations from a host information processing system to a storage server, the method on the storage server comprising:
   determining, at a storage server, that at least one portion of a query execution plan comprising a plurality of steps to access data in a data store on the storage server is to be off-loaded from a host information processing system to the storage server, wherein the host information processing system is separate and distinct from the storage server;
   offloading the at least one portion of the query execution plan from the host information processing system to the storage server, the offloading comprising at least:
      receiving, at the storage server from the host information processing system, at least a first set of keys from a first dimension table and at least a second set of keys from a second dimension table, wherein each of the first and second set of keys are associated with at least one fact table;
      receiving, at the storage server from the host information processing system, a set of locations associated with a set of foreign key indexes;
      traversing, at the storage server in response to the receiving, a set of fact table indexes;
      identifying, at the storage server in response to the traversing, at least a first set of Row Identifiers ("RIDs") associated with the first set of keys and at least a second set of RIDs associated with the second set of keys;
      performing, at the storage server, an operation on the first set of RIDs and the second set of RIDs to identify an intersecting set of RIDs; and
      storing, at the storage server, the intersecting set of RIDs.

2. The method of claim 1, further comprising:
   sending the intersecting set of RIDs to the host information processing system.

3. The method of claim 1, further comprising:
   performing a first SEMI-JOIN operation on the first set of keys and performing a second SEMI-JOIN operation on the second set of keys.

4. The method of claim 3, wherein the first SEMI-JOIN operation and the second SEMI-JOIN operation each comprise a join operation and a sort operation.

5. The method of claim 1, further comprising:
   receiving a probing request from the host information processing system comprising a payload for the operation on the first set of RIDs and the second set of RIDs to identify the intersecting set of RIDs.

6. The method of claim 5, further comprising:
   performing, in response to receiving the probing request, a portion of the AND operation.

7. The method of claim 1, wherein the identifying further comprises:
   identifying a total number of RIDs associated with the first set of keys and a total number of RIDs associated with the second set of keys; and
   sending the total number of RIDs associated with the first set of keys and the total number of RIDs associated with the second set of keys to the host information processing system.

8. A storage server for off-loading star-join operations from a host information processing system, the storage server comprising:
   a processor;
   a memory communicatively coupled to the processor;
   a data store communicatively coupled to the memory and the processor; and
   an off-load manager communicatively coupled to the processor and the memory, wherein the off-load manager is adapted to:
      determine that at least one portion of a query execution plan comprising a plurality of steps to access data in the data store is to be off-loaded from a host information processing system to the storage server, wherein the host information processing system is separate and distinct from the storage server;
      offloading the at least one portion of the query execution plan from the host information processing system to the storage server, the offloading comprising at least:
         receiving, from a host information processing system, at least a first set of keys from a first dimension table and at least a second set of keys from a second dimension table, wherein each of the first and second set of keys are associated with at least one fact table;
         receiving, from the host information processing system, a set of locations associated with a set of foreign key indexes;

traversing, in response to the receiving the set of locations, a set of fact table indexes;

identifying, in response to the traversing the set of fact table indexes, at least a first set of Row Identifiers ("RIDs") associated with the first set of keys and at least a second set of RIDs associated with the second set of keys;

performing an operation on the first set of RIDs and the second set of RIDs to identify an intersecting set of RIDs; and storing the intersecting set of RIDs.

9. The storage server of claim 8, wherein the off-load manager is further adapted to:

send the intersecting set of RIDs to the host information processing system.

10. The storage server of claim 8, wherein the off-load manager is further adapted to:

perform a first SEMI-JOIN operation on the first set of keys and performing a second SEMI-JOIN operation on the second set of keys.

11. The storage server of claim 10, wherein the first SEMI-JOIN operation and the second SEMI-JOIN operation each comprise a join operation and a sort operation.

12. The storage server of claim 8, wherein the off-load manager is further adapted to:

receive a probing request from the host information processing system comprising a payload for the AND operation.

13. The storage server of claim 12, wherein the off-load manager is further adapted to:

perform, in response to receiving the probing request, a portion of the AND operation.

14. The storage server of claim 8, wherein the off-load manager is further adapted to identify by:

identifying a total number of RIDs associated with the first set of keys and a total number of RIDs associated with the second set of keys; and sending the total number of RIDs associated with the first set of keys and the total number of RIDs associated with the second set of keys to the host information processing system.

15. A computer program storage product stored on a computer readable storage medium for off-loading star join operations from a host information processing system to a storage server, the computer program storage product comprising instructions for:

determining, at a storage server, that at least one portion of a query execution plan comprising a plurality of steps to access data in a data store on the storage server is to be off-loaded from a host information processing system to the storage server, wherein the host information processing system is separate and distinct from the storage server;

offloading the at least one portion of the query execution plan from the host information processing system to the storage server, the offloading comprising at least:

receiving at the storage server, from a host information processing system, at least a first set of keys from a first dimension table and at least a second set of keys from a second dimension table, wherein each of the first and second set of keys are associated with at least one fact table;

receiving at the storage server, from the host information processing system, a set of locations associated with a set of foreign key indexes;

traversing at the storage server, in response to the receiving, a set of fact table indexes;

identifying at the storage server, in response to the traversing, at least a first set of Row Identifiers ("RIDs") associated with the first set of keys and at least a second set of RIDs associated with the second set of keys;

performing at the storage server an operation on the first set of RIDs and the second set of RIDs to identify an intersecting set of RIDs; and sending by the storage server, the intersecting set of RIDs to the host information processing system.

16. The computer program storage product of claim 15, further comprising instructions for:

performing a first SEMI-JOIN operation on the first set of keys and performing a second SEMI-JOIN operation on the second set of keys.

17. The computer program storage product of claim 16, wherein the first SEMI-JOIN operation and the second SEMI-JOIN operation each comprise a join operation and a sort operation.

18. The computer program storage product of claim 15, further comprising instructions for:

receiving a probing request from the host information processing system comprising a payload for the operation on the first set of RIDs and the second set of RIDs to identify an intersecting set of RIDs.

19. The computer program storage product of claim 18, further comprising instructions for:

performing, in response to receiving the probing request, a portion of the AND operation.

20. The computer program storage product of claim 15, wherein the instructions for identifying further comprise instructions for:

identifying a total number of RIDs associated with the first set of keys and a total number of RIDs associated with the second set of keys; and sending the total number of RIDs associated with the first set of keys and the total number of RIDs associated with the second set of keys to the host information processing system.

* * * * *